United States Patent
Bianchi et al.

[11] Patent Number: 5,898,509
[45] Date of Patent: Apr. 27, 1999

[54] METHOD FOR IMPROVING THE SIGNAL-TO-NOISE RATIO OF A CCD SENSOR IN A COLOR IMAGING DEVICE

[75] Inventors: Mark J. Bianchi, Fort Collins; Oscar R. Herrera E., Greeley, both of Colo.

[73] Assignee: Hewlett-Packard Company, Palo Alto, Calif.

[21] Appl. No.: 08/720,987

[22] Filed: Oct. 15, 1996

[51] Int. Cl.⁶ .............. H01L 27/00; H04N 1/04; H04N 3/14

[52] U.S. Cl. .............. 358/483; 358/474; 348/272; 250/208.01

[58] Field of Search .................. 358/300, 302, 358/474, 483, 486, 471, 494, 482; 348/241, 250, 296, 319, 320, 321, 297, 272, 311, 312; 250/208.1

[56] References Cited

U.S. PATENT DOCUMENTS

| | | | |
|---|---|---|---|
| 4,408,231 | 10/1983 | Bushaw et al. | 358/406 |
| 4,839,739 | 6/1989 | Tachiuchi et al. | 358/466 |
| 5,105,264 | 4/1992 | Erhardt | 348/282 |
| 5,182,658 | 1/1993 | Ishizaki et al. | 358/483 |
| 5,479,207 | 12/1995 | Degi et al. | 348/297 |
| 5,585,847 | 12/1996 | Sayag | 348/266 |
| 5,668,593 | 9/1997 | Lareau et al. | 348/146 |

FOREIGN PATENT DOCUMENTS

| | | | |
|---|---|---|---|
| 698994 | 2/1996 | European Pat. Off. | H04N 1/48 |
| 0401567 | 12/1990 | Japan | 1/40 |
| 0486005 | 5/1992 | Japan | 3/15 |
| 2160061 | 6/1984 | United Kingdom | 3/15 |

OTHER PUBLICATIONS

Patent Abstracts of Japan; Pub. No. JP63076570; Pub.Date Jun. 4, 1988; vol. 12, No. 310; Yamamoto Yukio; Intl Cl. 1/04.

*Primary Examiner*—Kim Yen Vu
*Assistant Examiner*—Kimberly A. Williams
*Attorney, Agent, or Firm*—Augustus W. Winfield

[57] ABSTRACT

A method for color imaging using a photosensor array having multiple rows of charge-coupled-device cells. The exposure times for each color channel are adjusted to provide improved signal-to-noise. The overall cycle time is determined by the channel having the weakest signal. A sufficient number of shift pulses are added to ensure that the weakest signal can still result in a full scale output. Once the total number of shift pulses per cycle is determined, the exposure times for the remaining channels are determined as a fraction of the weakest signal's required exposure (if possible). Each row has a separate transfer gate control input. The timing of the transfer gate pulses is then determined, preferably centering the exposure times to reduce color misregistration.

2 Claims, 6 Drawing Sheets

METHOD FOR IMPROVING THE SIGNAL-TO-NOISE RATIO OF A CCD SENSOR IN A COLOR IMAGING DEVICE

FIELD OF INVENTION

This invention relates generally to digital imaging devices such as copiers, facsimile machines, digital cameras and image scanners and more specifically to electronics associated with charge-coupled-device (CCD) array sensors used in such imaging devices.

BACKGROUND OF THE INVENTION

Copiers, facsimile machines and image scanners convert visual images into an electronic form suitable for printing, storage, transmission, or other computer and electronic uses. A system typically includes a light source, an array of photosensors, and electronics for converting analog photosensor outputs into digital data. Light is reflected off of an opaque image medium or light is transmitted through a transparent image medium and focused onto the photosensors. Color devices may have multiple light sources, each with a different band of wavelengths, or broad spectrum light may be split into multiple bands by a color separator, or filters may be employed.

For color imaging, a common configuration for the photosensors is three or more linear rows of CCD elements. In a typical arrangement, one row receives light in a band of red wavelengths, one row receives light in a band of blue wavelengths, and one row receives light in a band of green wavelengths. Typically, all of the CCD rows are exposed for a fixed period of time, after which the charges are transferred in parallel to analog shift registers. The charges are then serially shifted bucket brigade style to charge detectors. The charge detectors provide a voltage, the resulting voltage is amplified, and the resulting amplifier output voltages are converted into digital data streams by analog-to-digital converters (ADC).

Each of the elements in each light measurement channel (CCD, amplifier, ADC) has a finite range. Ideally, for maximum signal-to-noise, each element operates over its full range. That is, for the maximum expected light intensity at the CCD, the CCD almost saturates, the amplifier almost saturates, and the resulting ADC output is almost the maximum digital value. Similarly, ideally, for the minimum expected light intensity at the CCD, the CCD, the amplifier output and the ADC output are all their opposite operating extremes relative to the values at the maximum light condition. In general, light intensity and CCD sensitivity may vary from system to system and may vary within a system over time. In addition, the maximum and minimum light intensities at the CCD may be different for one color band than for another color band. In addition, the maximum and minimum light intensities at the CCD may depend on whether the light is reflected from an opaque image or transmitted through a transparent image. Therefore, there is a general need for adjustment of various parameters in each light measurement channel to maximize the signal-to-noise. Potential areas of adjustment include light intensity, CCD exposure time, and amplifier gain.

There have been numerous approaches to adjustment of the various parameters. In U.S. Pat. No. 4,408,231(Bushaw et al), a course exposure adjustment is provided by an ability to double the exposure time, and a fine adjustment is provided by adjusting the lamp intensity. In U.S. Pat. No. 4,839,739 (Tachiuchi et al), CCD exposure time is adjusted by varying the frequency of the shift clock. In U.S. Pat. No. 5,182,658 (Ishizaki), the exposure time is made approximately constant for a range of image contrast by terminating exposure early if certain conditions are met. In U.S. Pat. No. 5,479,207 (Degi et al and in European Patent Application EP 0 401 567 A2 (Nagano), the shift clock is a fixed frequency, the time required to shift and convert all the charges is less than the CCD exposure time, and the CCD exposure time is adjusted by varying the number of shift pulses after the last valid charge has been converted.

There is a need for further improvement in adjustment for maximum signal-to-noise. In particular, there is a need for independent adjustment for each color in a color imaging device to maximize the signal-to-noise for each color.

SUMMARY OF THE INVENTION

For each color channel, the CCD exposure time for an image line is variable within an overall cycle time that is the same for every color channel. The overall cycle time is determined by the channel requiring the longest exposure time. In a first embodiment, all the exposures start at the same time and the ending times are variable. In a second embodiment, all the exposures end at the same time and the starting times are variable. In a third embodiment, the mid-points of the exposure times are aligned to improve color registration, with both starting time and ending time adjusted as necessary.

Each CCD row has a separate independent transfer gate signal that causes the electric charge in each CCD element to be transferred to the analog shift register. A common clock is used for all the analog shift registers. The number of clock cycles required to clear the analog shift registers is less than the number of clock cycles during the longest exposure time.

DETAILED DESCRIPTION OF THE PREFERRED EMBODIMENT OF THE INVENTION

Figure 1:
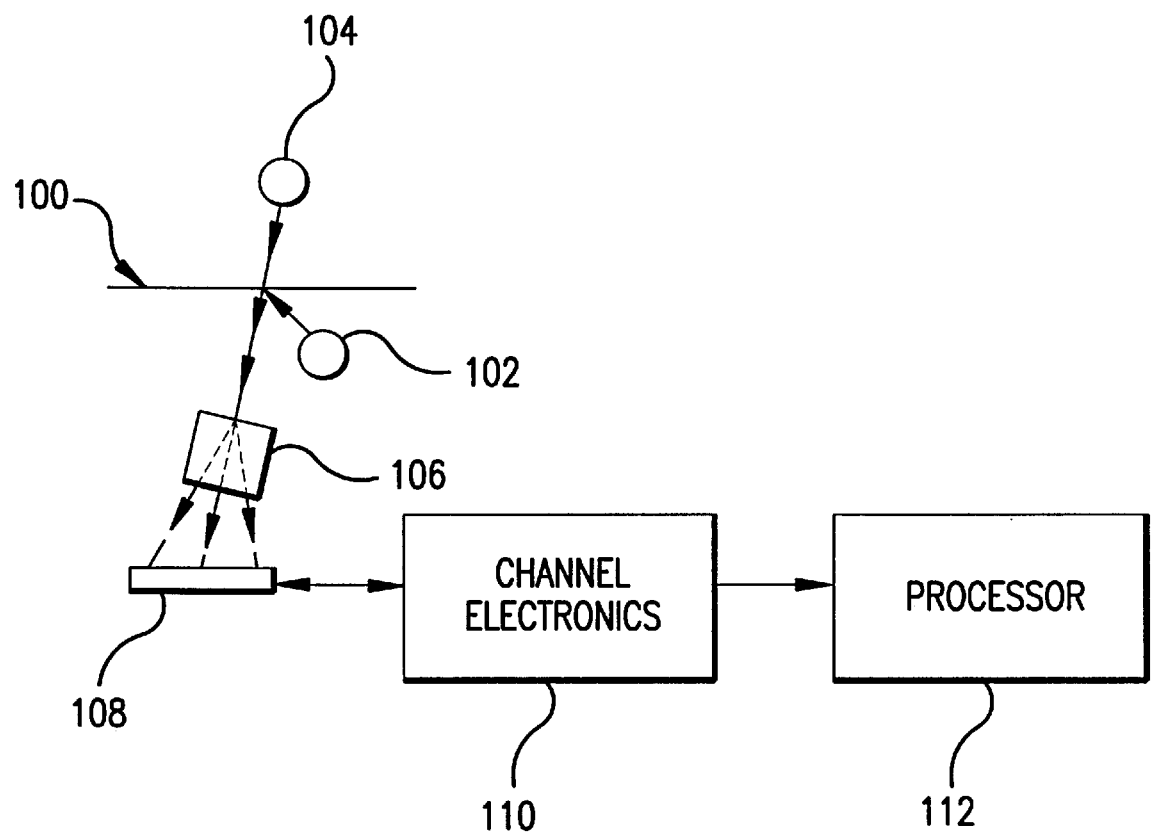
FIG. 1 is a block diagram schematic of a color imaging system in accordance with the invention.

FIG. 1 illustrates a digital imaging system. An image 100 is illuminated by a light source 102 for opaque images or by light source 104 for transparent images. A color separation system 106 provides multiple bands of wavelengths onto a photosensor array 108. The color separation system 106 may also include focusing optics. FIG. 1 depicts a single line on image 100 being focused onto multiple rows of photosensor array 108. In some systems, for example systems employing filters, each row on the photosensor array may receive light from a different line on the image. A channel electronics system 110 controls the timing of various signals to the photosensor array 108. In addition, the channel electronics system receives analog signals from the photosensor array and converts those analog signals into digital data streams for a processor 112. The final digital representation of image 100 may then be printed, displayed, stored, or transmitted to another processor.

Figure 2:
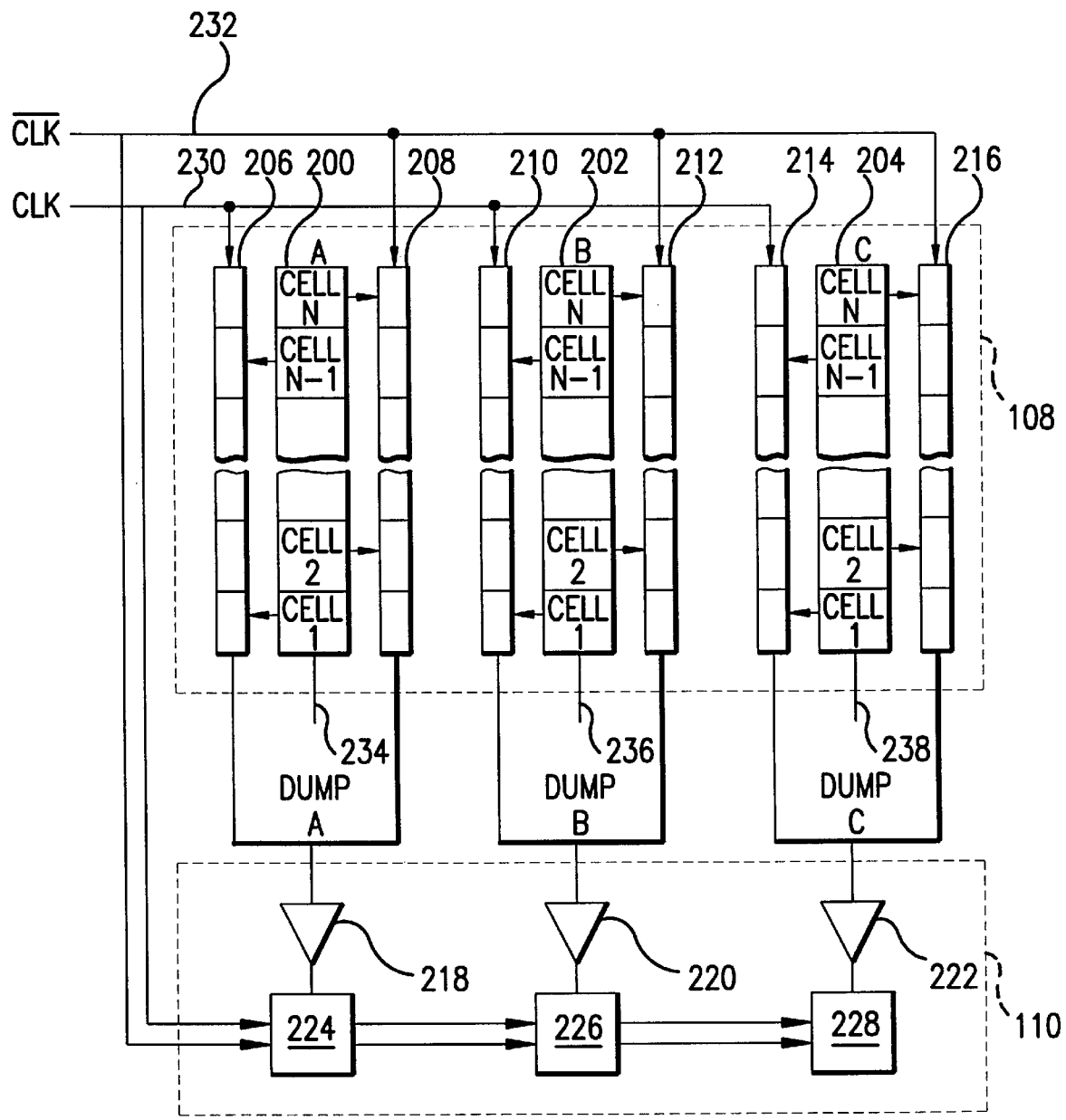
FIG. 2 is a block diagram schematic of the photosensors and associated electronics for the imaging system of FIG. 1.

FIG. 2 illustrates additional detail for the photosensor array 108 and parts of the channel electronics 110. The photosensor array 108 illustrated in FIG. 2 has three linear rows of CCD cells (200, 202, 204) designated as rows A, B, and C. In general, there may be more than three rows, cells may be staggered or overlapping, and the rows may be non-linear to compensate for optical distortion. However, in general, light on one CCD row originates from a single line on an image (FIG. 1, 100). In the photosensor array illustrated in FIG. 2, each row of CCD cells has two associated bucket-brigade analog shift registers (206–216). For each row of CCD cells, one of the two associated analog shift registers receives and shifts charges for all the odd numbered cells and the other associated analog shift register receives and shifts charges for all the even numbered cells. Alternatively, a single shift register may be used for all CCD cells, simply requiring twice the clock frequency to shift all the charges out in the same amount of time. Charges are buffered and amplified by amplifiers (218–222). The outputs of the amplifiers are digitized by ADC's (224–228). In FIG. 2, the amplifiers are depicted as being separate from the photosensor array 108 but commercially available sensor arrays may include charge detection and some amplification.

Each row of CCD cells receives a transfer gate signal called DUMP (234–238). On the falling edge of DUMP, the charge for each CCD cell is transferred to a corresponding analog shift register cell and all of the CCD cells are initialized. In later figures, when the CCD charging waveforms are illustrated, when a CCD cell is initialized it is depicted as discharged and ready to be charged as a result of receiving photons. This is for illustration only. When a CCD cell is initialized, the cell may be charged and ready to be discharged as a result of receiving photons.

Each of the ADC's (224–228) receives amplified voltage signals alternately from two analog shift registers and converts the voltages synchronously with the clock signals for the analog shift registers. In the system depicted in FIG. 2, each of the ADC's (224–228) receives a clock signal (CLK) 230 and its inverse ($\overline{\text{CLK}}$) 232. Each of the analog shift registers for odd numbered cells receives clock signal (CLK) 230 and each of the analog shift registers for even numbered cells receives the inverse clock signal ($\overline{\text{CLK}}$) 232. For example, at a falling edge of CLK (230) shift register 206 has a charge ready for digitizing and ADC 224 starts the process of digitizing the resulting amplified voltage and at the next falling edge of $\overline{\text{CLK}}$232, shift register 208 has a charge ready for digitizing and ADC 224 starts the process of digitizing the resulting amplified voltage. Alternatively, each of the ADC's may receive a clock that is twice the frequency of CLK 230, but the important feature is that each ADC converts charges to digital values as they are alternately shifted out of the analog shift registers.

Figure 3:
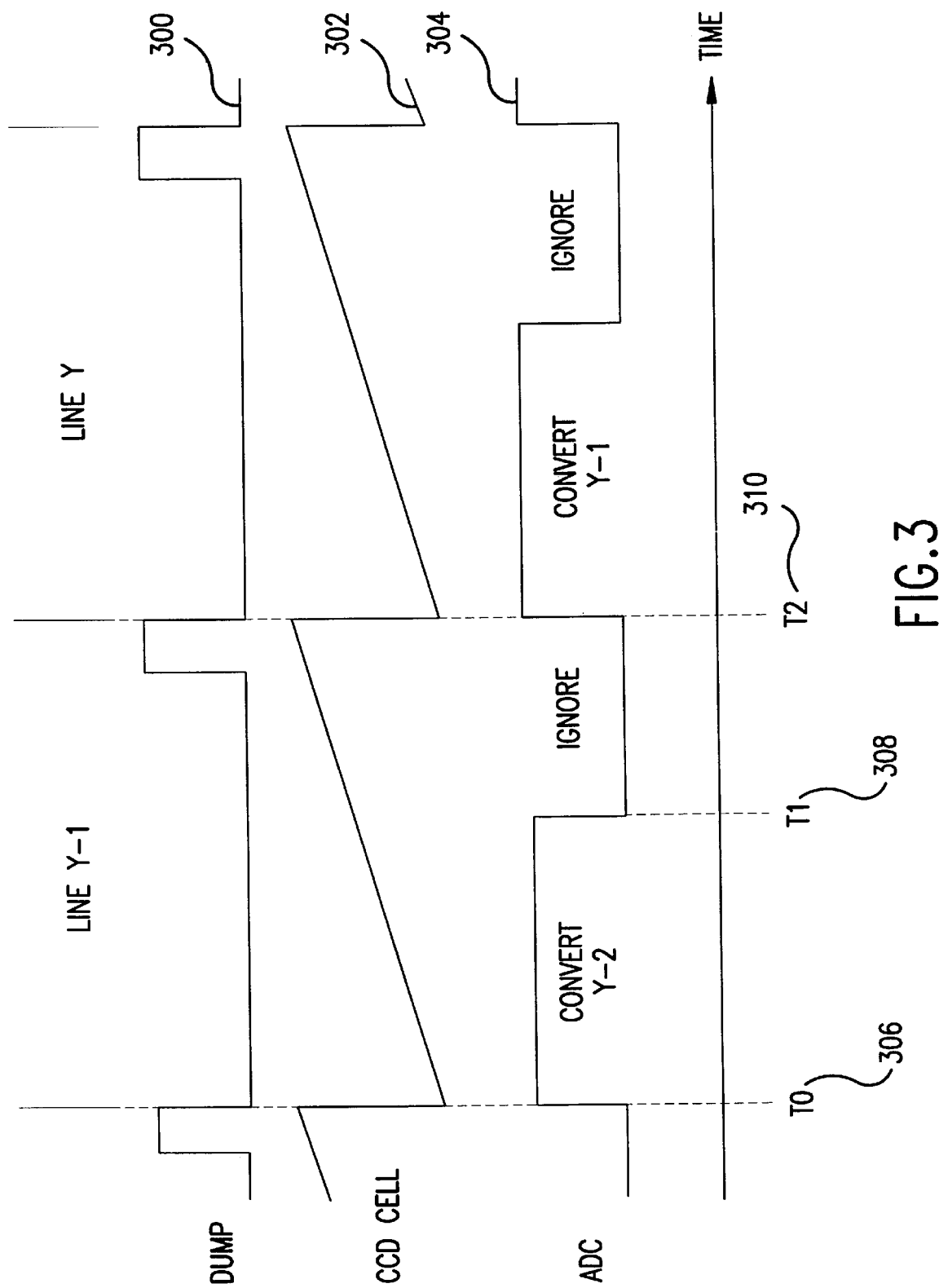
FIG. 3 is a time plot of waveforms of interest with exposure times for all channels having identical starting and ending times.

In general, for each of the CCD rows, the light intensity and CCD sensitivity is such that the time required for analog-to-digital conversion is less than the exposure time needed to saturate the CCD's. Therefore, for each CCD row, exposure time can be made independent of analog-to-digital conversion time. As taught in Degi et al, after analog-to-digital conversion is complete, the system continues to shift the analog shift registers and ignores the digitized results after N valid digitized results, where N is the number of CCD cells per row. FIG. 3 illustrates waveforms and timing for one row. Lines Y-2, Y-1 and Y refer to lines on the image (FIG. 1, 100). In FIG. 3, signal DUMP (300) has a falling edge at time T0 (306). At T0, a CCD cell (302) is discharged and the CCD cell charge starts changing in response to received photons. Also at time T0, the ADC starts converting the charges from the previous exposure (depicted by waveform 304 being high). At time T1 (308), N analog charges have been converted to digital values. The clock for the analog shift registers and ADC continues to run, and the resulting digital values are ignored until time T2 (310) (depicted by waveform 304 being low). At time T2, signal DUMP once again transfers CCD charges to the analog shift registers and the process cycle starts again.

The concept of FIG. 3 may be applied to a color imaging device with multiple color channels. The timing from T0 (306) to T2 (310) may be determined by the channel that saturates first. However, if the other channels have a substantially lower light intensity or substantially lower sensitivity, the signal-to-noise value for the other channels will be substantially worse than the channel that saturates first because the noise will be the same but the signals of the other channels will be lower. For example, for color negative film strips, the spectral response is such that the amount of blue light transmitted is approximately half the amount of green light transmitted, which is approximately half the amount of red light transmitted. This results in a four to one ratio of transmitted blue light compared to transmitted red light. The magnitude imbalance can be corrected by adjusting the gain for each color channel. However, this does not address the signal-to-noise problem. To maintain a similar signal-to-noise ratio across all channels, the signals coming from each CCD row should be maximized.

Figure 4:
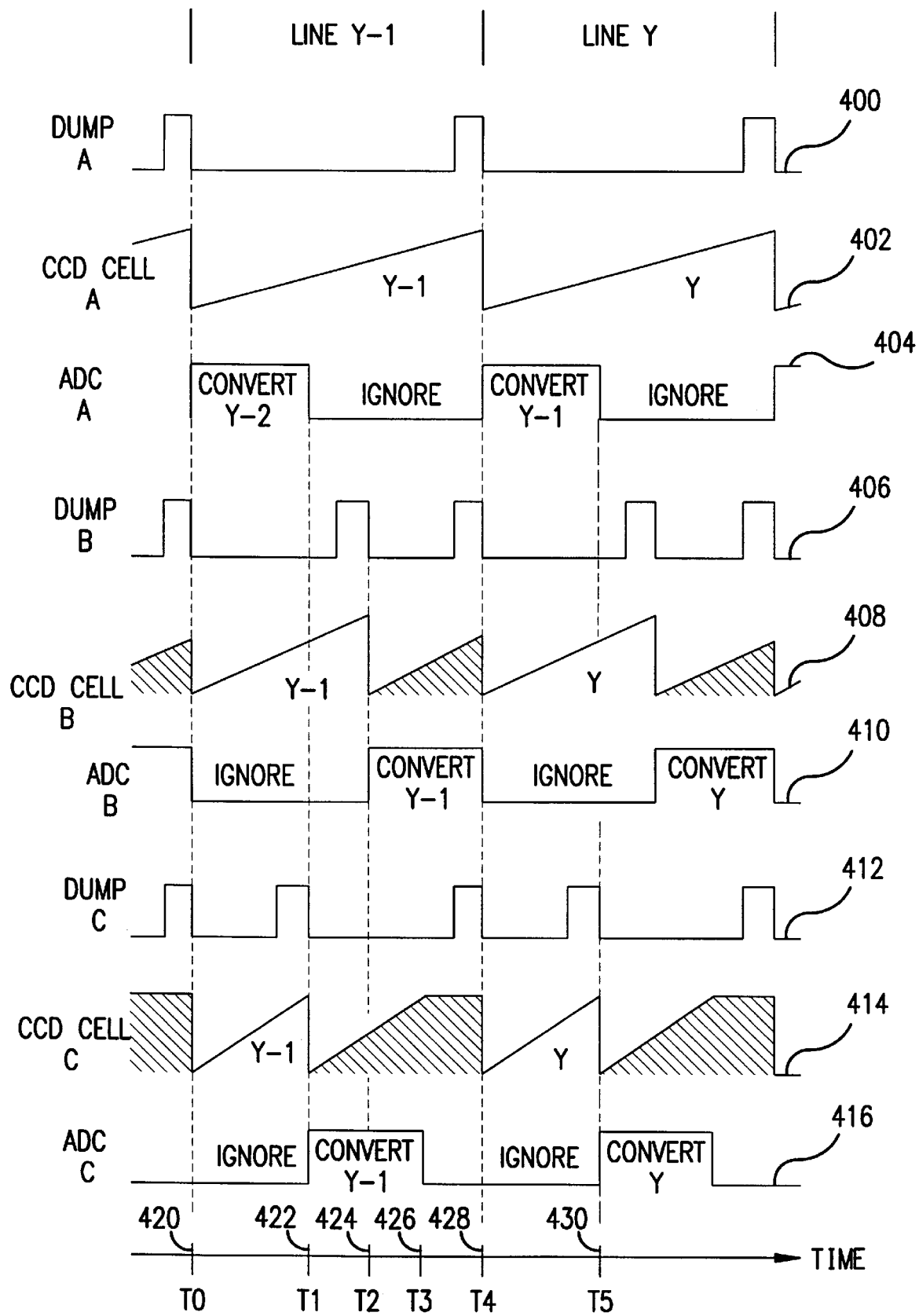
FIG. 4 is a time plot of waveforms of interest with exposure times for all channel shaving identical starting times but variable ending times.

FIG. 4 illustrates a first embodiment of an improvement in which the signal-to-noise is maximized for each channel. For the waveforms of FIG. 4, each row of CCD cells has a separate DUMP signal, as illustrated in FIG. 2. Then, instead of one dump pulse starting and ending each cycle as in FIG. 3, two DUMP pulses per cycle can be asserted, one to start the cycle and one to end the cycle. In FIG. 4, the references to lines Y-2, Y-1 and Y are references to lines on the image as in FIG. 1 where light from one image line is split and focused onto multiple sensor rows. Consider, for example, the signals corresponding to image line Y-1. At time T0 (420) all CCD cells in all rows are initialized. At time T1 (422), a CCD cell 414 in row C has had sufficient time to reach a maximum value given the maximum expected light intensity for that row, and a second DUMP C (412) pulse is asserted. At that time, the ADC for channel C (416) starts converting the analog voltages. In addition, the CCD cell 414 continues to accumulate charge. At time T2 (424), a CCD cell (408) in row B has had sufficient time to reach a maximum value given the maximum expected light intensity for that row, and a second DUMP B (406) pulse is asserted. At time T3 (426), the channel C ADC (waveform 416) has completed converting the N valid voltages from channel C and successive output values from the ADC are ignored (waveform 416 is low). In FIG. 4, channel A is the channel having the longest exposure time, thereby determining the overall cycle time of {T4 (428) minus T0 (420)}. Note that in FIG. 4, each of CCD's are initialized simultaneously at T0 (420), but valid charges are transferred at different times. The crosshatched areas of CCD waveforms 408 and 414 are digitized but the resulting values are ignored.

Figure 5:
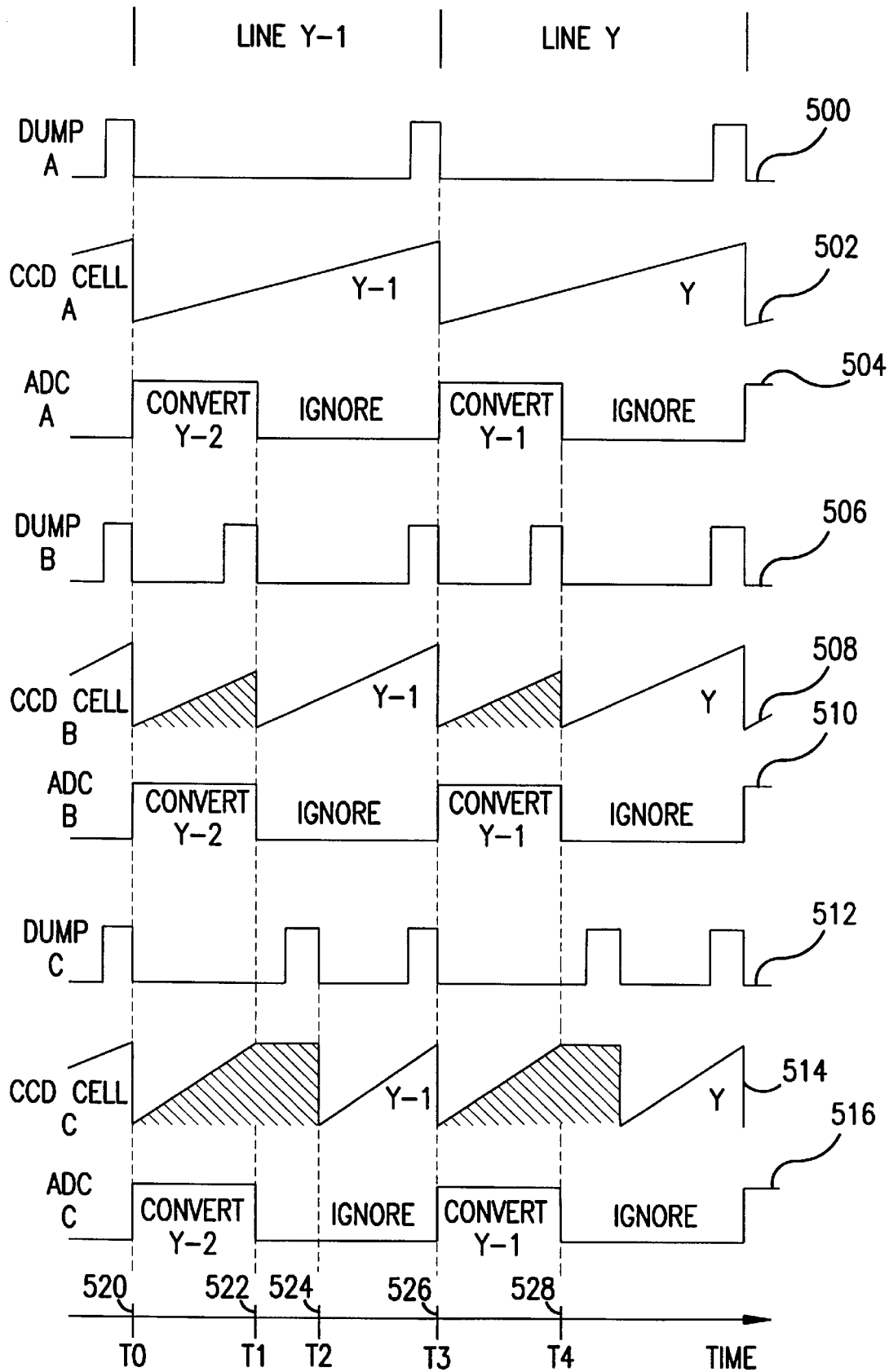
FIG. 5 is a time plot of waveforms of interest with exposure times for all channels having identical ending times but variable starting times.

FIG. 5 illustrates a second embodiment in which CCD exposures start at different times but end simultaneously. Again, consider image line Y-1. The overall cycle time for all channels begins at time T0 (520) when DUMP signals (500, 506, 512) all go low simultaneously. CCD's for row C (waveform 514) and row B (waveform 508) start accumulating charges that are later ignored. At time T1 (522), signal DUMP B (506) is asserted for CCD row B, discharging CCD's in row B (waveform 508) and the CCD's in row B begin charging again. Likewise, at time T2 (524), signal DUMP C (512) is asserted for CCD row C, discharging CCD's in row C (waveform 514) and the CCD's in row C begin charging again. At time T3 (526), all DUMP signals (500, 506, 512) go low simultaneously and all ADC's (waveforms 504, 510, and 516) start converting valid voltages for line Y-1. At time T4 (528), N valid voltages from all channels have been converted for line Y-1.

Referring back to FIG. 1, image 100 may be scanned by moving the image 100 past a stationary photosensor array 108 or by moving the photosensor array 108 past a stationary image 100. Either way, there is movement of lines on image 100 relative to rows on photosensor array 108. If the relative movement is continuous, then the exposures for each sensor row as illustrated in FIGS. 4 and 5 correspond to slightly different portions of image 100. For example, in FIG. 5, a CCD cell in row A (waveform 502) is exposed to a relatively wide stripe of image 100 compared to a CCD cell in row C (non-crosshatched portions of waveform 514). Therefore, there is some color misregistration. If for example, row C corresponds to red and row A corresponds to blue, the digitized red portions of the image will be slightly offset from the digitized blue portions of the image. More accurately, the digitized red stripes will be a portion of the blue stripes and aligned with one edge of the blue stripes. Color registration is improved if the midpoints of the exposures are aligned.

Figure 6:
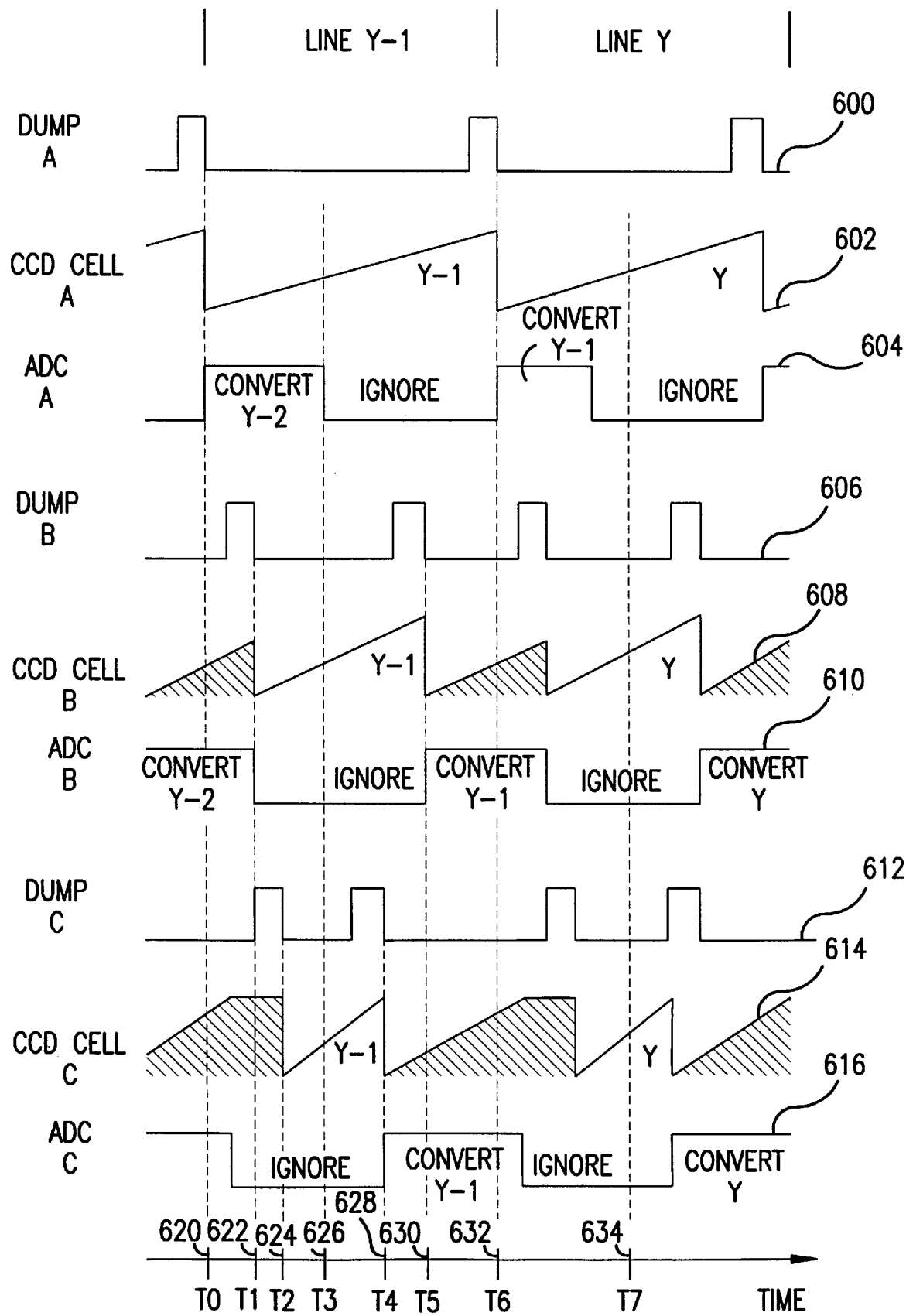
FIG. 6 is a time plot of waveforms of interest with exposure times for all channels having substantially identical midpoints.

FIG. 6 illustrates a third embodiment in which the midpoints of the exposures are aligned. The valid exposure time for Channel A (waveform 602) starts at time T0 (620) and ends at time T6 (632). The valid exposure time for Channel B (non-crosshatched portion of waveform 608) starts at time T1 (622) and ends at time T5 (630). The valid exposure time for Channel C (non-crosshatched portion of waveform 614) starts at time T2 (624) and ends at time T4 (628). The midpoint of all the valid exposure times is time T3 (626) (and time T7 (634) and so forth). Within each channel, the DUMP signals (600, 606, 612) start and stop the exposures as appropriate.

Note in FIGS. 4, 5 and 6, for each channel having an exposure time less than the overall cycle time (Channels B and C), that analog-to-digital conversion (ADC waveform high) occurs during a charging time that can be ignored. The time for analog-to-digital conversion must be less than or equal to the shortest exposure time that can be ignored. Consider in particular FIG. 4, waveforms 408 and 410, FIG. 5, waveforms 508 and 510 and FIG. 6, waveforms 608 and 610. For each of these, the end of analog-to-digital conversion is illustrated as coinciding with a dump pulse that initializes all CCD's (conversion time could be shorter but cannot be longer). If, for example, a channel requires a valid charge time that is nine-tenths of the overall cycle time and one-tenth of the overall cycle time is to be ignored, analog-to-digital conversion must be completed in one-tenth of the overall cycle time.

In an actual embodiment, a low resolution preview scan of an image is performed. The preview scan is examined to determine the correct exposure for each channel. The overall cycle time is determined by the channel having the weakest signal. A sufficient number of clock pulses are added to ensure that the weakest signal can still result in a full scale output. Once the total number of clock pulses per cycle is determined, the exposure times for the remaining channels are determined as a fraction of the weakest signal's required exposure (if possible). The timing of the DUMP pulses is then determined, centering the exposure times to reduce color misregistration.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of imaging using a photosensor array having a plurality of rows of charge-coupled-device cells, the method comprising the following steps:

exposing a first row of the charge-coupled-device cells for a first exposure time; and exposing a second row of the charge-coupled-device cells for a second exposure time, the first and second exposure times being unequal, and wherein the first and second exposure times have mid-points at the same time.

2. A method of imaging using a photosensor array having a plurality of rows of charge-coupled-device cells, the method comprising the following steps:

exposing a first row of the charge-coupled-device cells for a first exposure time; and exposing a second row of the charge-coupled-device cells for a second exposure time, the first and second exposure times being unequal, and wherein the first and second exposure times start at the same time.

* * * * *